United States Patent [19]
Rowland-Hill et al.

[11] 3,779,251
[45] Dec. 18, 1973

[54] CROP ELEVATOR FOR A COMBINE

[75] Inventors: Edward William Rowland-Hill, Lancaster; Edwin O. Margerum, Paradise, both of Pa.

[73] Assignee: Sperry Rand Corporation, New Holland, Pa.

[22] Filed: Sept. 20, 1971

[21] Appl. No.: 181,913

[52] U.S. Cl. ......... 130/27 JT, 130/27 T, 56/DIG. 15
[51] Int. Cl. ............................................. A01f 12/10
[58] Field of Search ..................... 130/27 JT, 27 E, 130/27 P, 27 T, 27 S, 27 J, 27 L; 56/DIG. 15

[56] References Cited
UNITED STATES PATENTS

| | | | |
|---|---|---|---|
| 3,664,348 | 5/1972 | Maiste et al. | 130/27 JT |
| 2,762,185 | 9/1956 | Hyman et al. | 130/27 R |
| 3,073,099 | 1/1963 | Andersen | 56/DIG. 15 |
| 524,954 | 8/1894 | Robinson | 130/27 E |

FOREIGN PATENTS OR APPLICATIONS 240,374  3/1968  U.S.S.R. ........................... 130/27 P

Primary Examiner—Antonio F. Guida
Attorney—Frank A. Seemar et al.

[57] ABSTRACT

A combine crop elevator delivers to the intake of a combine a rapidly moving thin mat of crop material clear of stones and other debris. The crop material is progressively increased in speed by a chain type of conveyor receiving the crop material from a header, a following transverse intermediate bladed beater and a transverse rear discharge bladed beater. The crop material is cleared by the cooperative interrelation of the intermediate beater and a stone trap positioned underneath the forward portion of the intermediate beater to collect stones, debris and the like deflected downward by the intermediate beater as it sweeps the crop material rearwardly.

8 Claims, 8 Drawing Figures

PATENTED DEC 18 1973

INVENTORS
EDWARD WILLIAM ROWLAND-HILL
EDWIN O. MARGERUM
BY George C Bower ATTORNEY

PATENTED DEC 18 1973

INVENTOR
EDWARD WILLIAM ROWLAND-HILL
BY EDWIN O. MARGERUM
George C. Bower
ATTORNEY

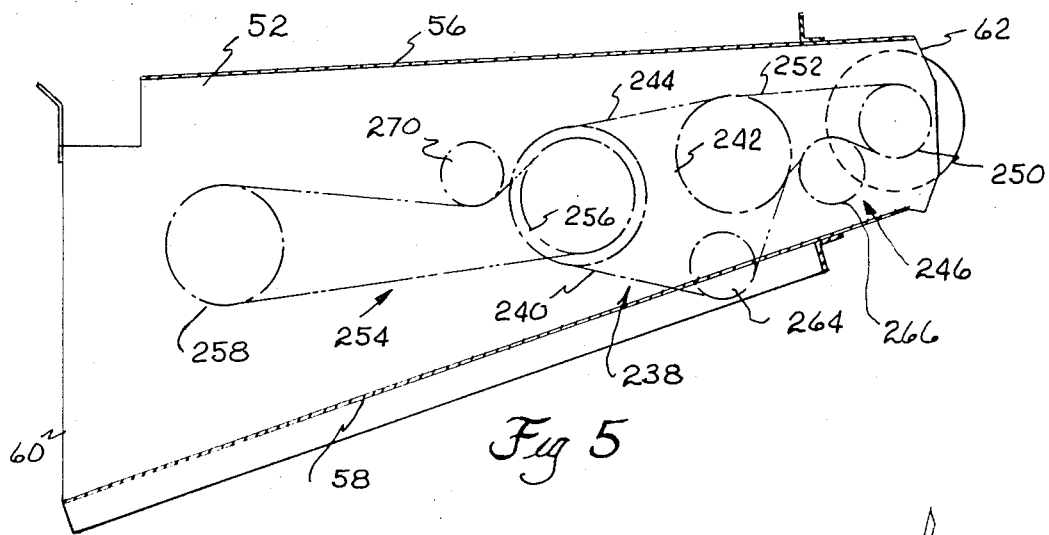
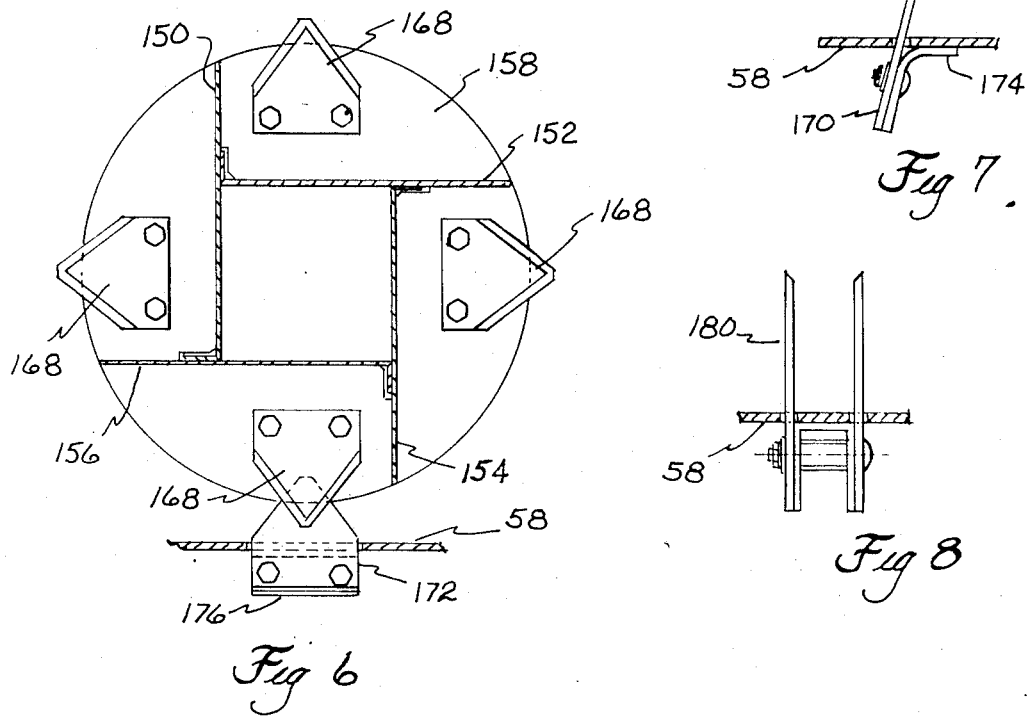

CROP ELEVATOR FOR A COMBINE

FIELD OF THE INVENTION

This invention relates to crop elevators for combines and more particularly to the conveying and clearing means in the crop elevator for transferring the harvested crops from the header to the combine and for separating stones, debris and the like from the conveyed crops.

BACKGROUND OF THE INVENTION

In the threshing of crop material by a combine, the crop material passes through the threshing means as a rapidly moving thin mat. The peripheral speed of the threshing rotor is determined by the speed of the rasp bars to properly thresh the crop material. In axial flow combines, the threshing section is preceded by a feed section which is usually an auger rotating with the threshing rotor. This feed section transforms the slowly moving thick mat of crop material received from the conventional crop elevator into a rapidly moving, thin mat for the threshing section. The mat, in addition to being thin and moving rapidly, should be fed in a substantially constant thickness for a uniform and thorough threshing. The augers do not provide this constancy of thickness. If the crop elevator passes bunched crop material to the augers they will in turn deliver it to the threshing section in a massive form rather than in a thin mat. These clumps are a strain on the machine particularly if they occur frequently and the crop material in this form is not properly threshed. Another shortcoming of the auger feed is the acceptance of stones and other debris which the auger passes on to the threshing section. Although an axial flow unit has a high capability in passing stones, pieces of iron and the like, it is preferable to avoid it since there is the possibility of damage to the unit.

OBJECTS OF THE INVENTION

It is, therefore, an object of this invention to avoid the foregoing shortcomings of the feed auger by feeding the harvested crop material to the combine in a rapidly moving thin mat clear of stones, debris and the like.

Another object of this invention is to feed the harvested crop material to the combine in a rapidly moving, thin, debris free mat of crop material by a crop elevator having the same size as and utilizing to the greatest advantage similar parts from conventional crop elevators.

Another object of the invention is to progressively increase the speed of the crop material to remove the stones and other debris from the harvested crop material as the crop material is conveyed through the crop elevator.

SUMMARY OF THE INVENTION

In summary, this invention comprises a combine crop elevator having a forward chain type crop conveyor, an intermediate bladed beater, and a rear bladed beater for progressively increasing the rate of flow of the crop material through the crop elevator and having a stone trap underneath the forward portion of the intermediate beater for receiving debris projected downwardly by the intermediate beater for the discharge of the harvested crop material in a rapidly moving thin, debris free mat to the combine.

These and other objects and advantages of this invention will be apparent from the following description and claims taken in connection with the accompanying drawings which illustrate the various features of this invention.

BRIEF DESCRIPTION OF THE DRAWINGS

FIG. 5 is a diagrammatic view of the drives and the right side of the casing of the crop elevator.

FIG. 6 is a sectional view of the intermediate beater taken along line 6—6 of FIG. 4.

FIG. 7 is a fragmentary view of a single stationary knife and mounting.

FIG. 8 is a fragmentary view of the stationary divider knives and mounting.

DETAILED DESCRIPTION OF THE PREFERRED EMBODIMENT

INTRODUCTION

Figure 1:
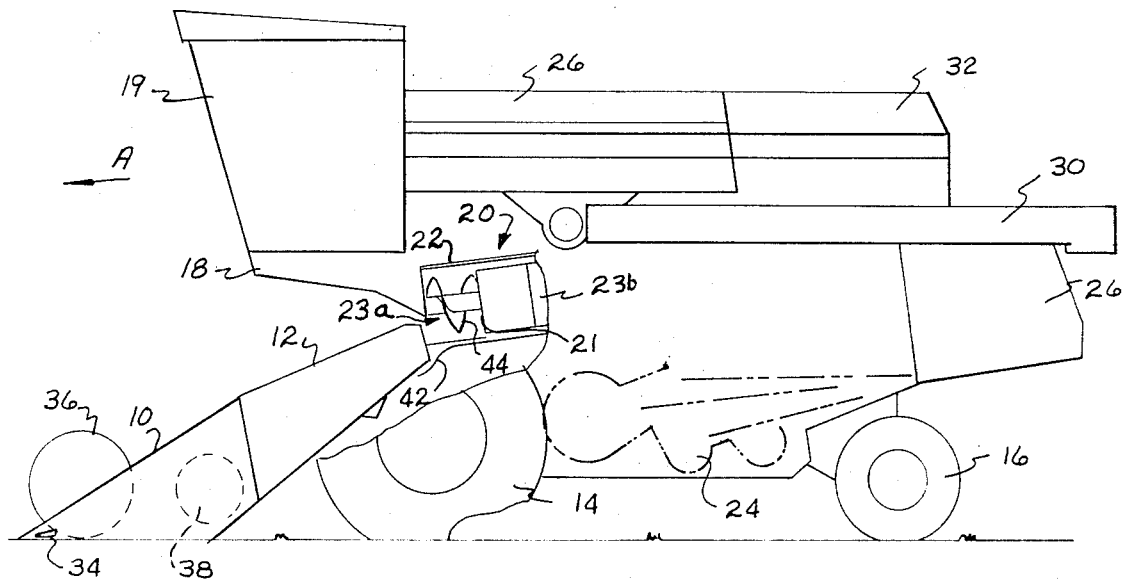
FIG. 1 is a side view of the combine with the crop elevator and a header.

As it is usual in the description of agricultural machines the right and left sides are referenced to the forward movement of the machine indicated by the arrow A in the drawings. The agricultural machine described herein is a self-propelled combine of the axial flow type and shown in FIG. 1 of the drawings with the header 10 supported by the crop elevator 12. The crop elevator 12, in accordance with the invention, forms the crop material into a rapidly moving, thin, debris free mat. The combine is mounted on two large front drive wheels 14 and on two small trailing steering wheels 16 in the rear. On the front of the combine is the operator's platform 18 extending forwardly over the crop elevator 12. The operator's platform 18 has the controls for operating the various components of the combine such as the speed and steering of the combine. A cab 19 encloses the platform and protects the operator from the dust and dirt and from the heat, if air conditioned.

An axial flow means 20 extends fore-and-aft in the combine and has casing means 21 and rotor means 22 therein. These form the crop feeding means 23a, threshing and separating means 23b and separating means (not shown). The axial flow means may be a single axial unit or a double axial unit. The crop feeding means 23a is in direct communication with the crop elevator 12 for receiving harvested crop therefrom. The crop handling and cleaning means 24 is housed within the combine, and extends from the front of the axial flow threshing and separating means to the rear hood 26 through which the chaff from the grain handling and cleaning means is discharged. The straw from the axial flow unit is also discharged through the hood. A grain tank 26 is mounted on top of the combine for temporarily storing clean grain and has an unloading auger 30 on the left side for discharging the grain tank. Also on top of the combine and immediately to the rear of the grain tank is the engine 32 connected by various drives (not shown) to the rotor means 22, the grain handling and cleaning means 24, the drive wheels 14, crop elevator 12 and the header 10.

The header 10 mounted on the crop elevator 12 has a sickle 34, reel 36 for gathering and cutting the standing crops and a transverse auger 38 consolidating the harvested crop material from the reel and delivering it to the crop elevator 12. The header is substantially wider than the combine and usually extends transversely to or beyond the large, spaced front drive wheels 14. The crop elevator 12 is narrower and about the width of the combine for transporting the harvested crop upwardly and rearwardly to the crop feeding means 23a which comprises sloped ramp means 42 for guiding the crop material into the feed augers 44. The augers feed the harvested crop material to the threshing and separating means 23b. The crop material is threshed and the grain separated therefrom. The threshed straw is discharged out through the hood 26 and the grain dropped onto the grain cleaning and handling means 24. The clean grain is carried up to the grain tank 26 by a grain elevator (not shown).

CROP ELEVATOR

The inventive feature in this combine and described herein is the new and improved crop elevator 12. Although this invention is described in connection with an axial flow type combine and to overcome the shortcomings of the auger feed it may be also used advantageously with a conventional combine having a transverse threshing cylinder. The particular feature of the crop elevator is that it accelerates the crop material received at the header end, clears the crop material of debris and delivers it in a rapidly moving mat to the axial flow crop feeding means 23a. The speed of the crop material delivered to the combine is compatible with the speed of the feed augers 44 and threshing and separating means 23b of the combine so that the debris free crop material will flow rapidly and substantially evenly from the crop elevator to the threshing and separating means.

The crop elevator is shown in detail in FIGS. 2-5 and comprises an outer rectangular shaped housing or casing 50 having right and left side walls 52 and 54 and top and bottom walls 56 and 58, respectively. The crop material is received from the header 10 through a front opening 60 and is discharged through a rear opening 62. Inside the casing 50 is the chain conveyor 64, the intermediate beater 66 and the rear or discharge beater 68 rotably mounted in the side walls 52 and 54.

CHAIN TYPE CONVEYOR OF THE CROP ELEVATOR

The chain and sprocket conveyor 64 comprises a large hollow cylinder or drum 70 within the casing and extending across the front of the crop elevator at the front opening 60. A power transmitting sprocket means 72 is intermediate the front and rear openings and extends across the crop elevator. Three chains 74,76 and 78 are spaced across the drum 70 and the sprocket means 72 and ride on flanged rings 80,82,84 on the drum and mesh with sprockets 86,88,90 of the sprocket means 72. The drum 70 is rotatably mounted at each end in the arms 98 which are pivotally mounted on the side walls 52 and 54 rearwardly of the drum so that the drum will respond to the amount of crop material fed to the crop elevator by the header 10. The arms are spring loaded by the spring means 100 to urge the drum 70 downward against the upwardly pressing crop material. The sprocket means 72 has a shaft 101 rotatably attached to mounting plates 102,104 which are adjustably fastened to the side walls 52,54. The description of these adjustable mountings of the sprocket means 72 will be taken in connection with the mounting on the side wall 54. The mounting plate 104 on the left side wall 54 is similar to the mounting plate 102 on the right side wall 52. The plate 104 is fastened to the wall 54 by the bolts 106 extending through the upwardly elongated slots 108. The plate 104 is adjusted to the desired position by the nuts 109 fastened on the threaded member 110 welded to the flange 104a on the plate 104 and to the bracket 112 secured to the side wall 54. The plate 104 has a plate 114 secured thereto and coextensive with the lower portion of the plate 104. Bearing 116 is fastened to the plates 104 and 114 on the outer side of the plate 104 and fits through the wall 54 through the oval shaped opening 118 for permitting movement of the bearing along the wall. The shaft 101 extends through the plate 102 and wall 52 for mounting on the right side in the bearing 122. The top wall 56 has an opening above the end of the chain conveyor. The opening is covered by lid 124. The adjusting means of the plates 102,104 are accessible through these openings to vary the space between the rear end of the chain conveyor and the plate 126 underneath the chain conveyor.

The plate 126, which extends across the elevator, is attached to the lower wall 58 underneath the front drum 70 and underneath the sprocket means 72 by a beam 128. The beam slopes the plate from the bottom wall at the discharge end of the chain conveyor. The plate 126 forms a feed ramp which is spaced from the lower run of the chain conveyor. The spacing is adjusted to accommodate different thicknesses of crop mats. Another beam 130 is attached to the mounting plates 102,104 and extends across the crop elevator between the upper and lower runs of the chains. A crop divider may be provided to extend forwardly from the beam 130 to separate the upper and lower chain runs. The beam 130 moves with the adjustment of the mounting plates 102,104.

INTERMEDIATE BEATER OF THE CROP ELEVATOR

Figure 2:
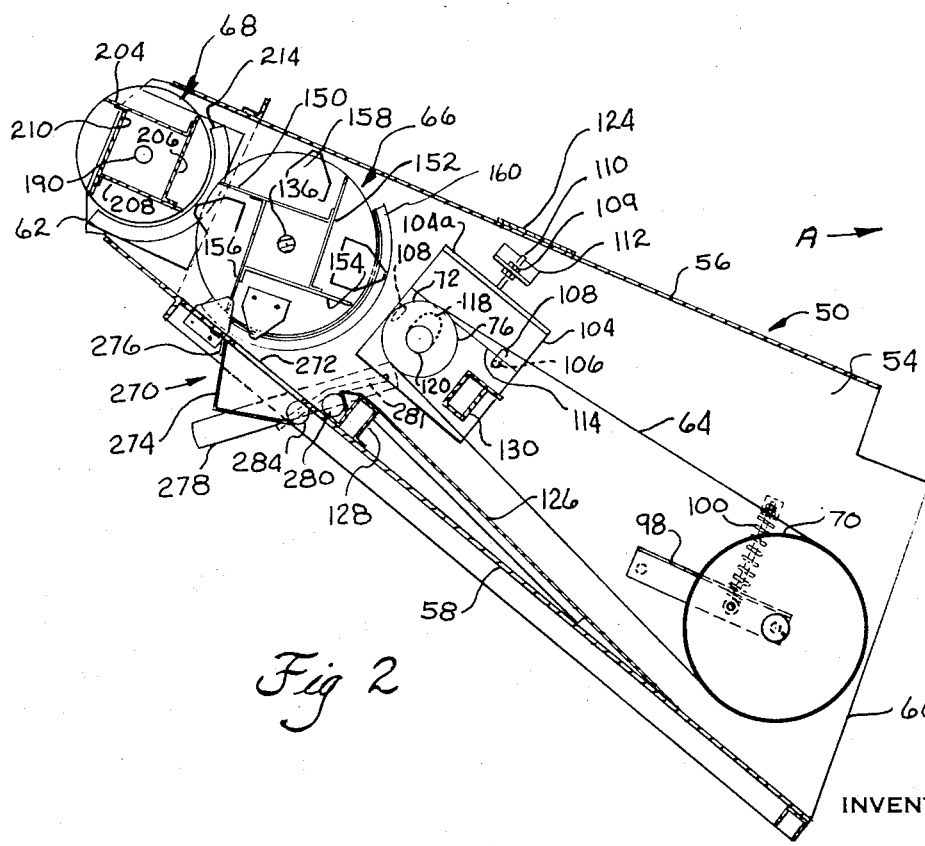
FIG. 2 is a sectional view of the crop elevator taken along line 2—2 of FIG. 3.
Figure 3:
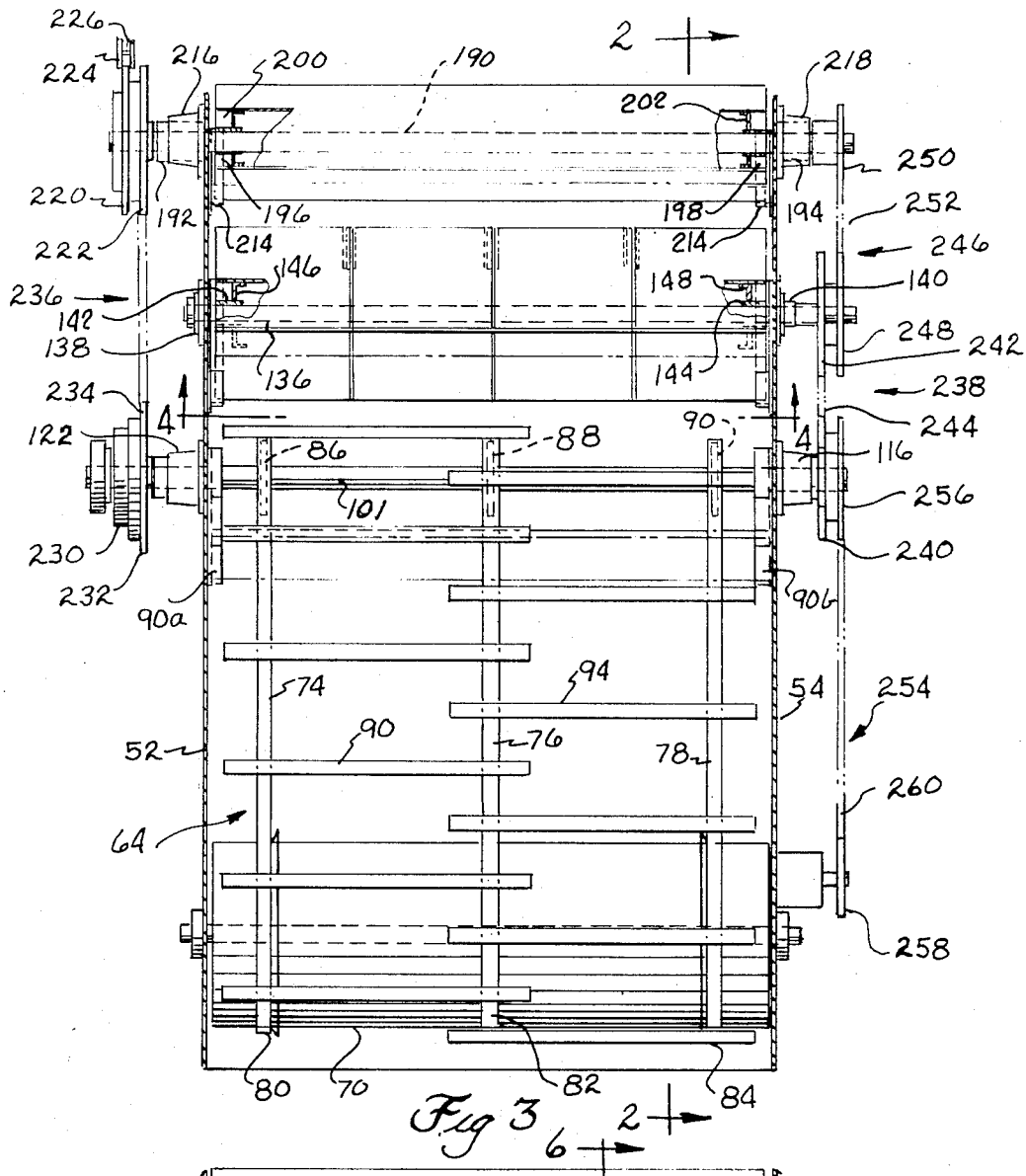
FIG. 3 is a top view of the upper wall removed.
Figure 4:
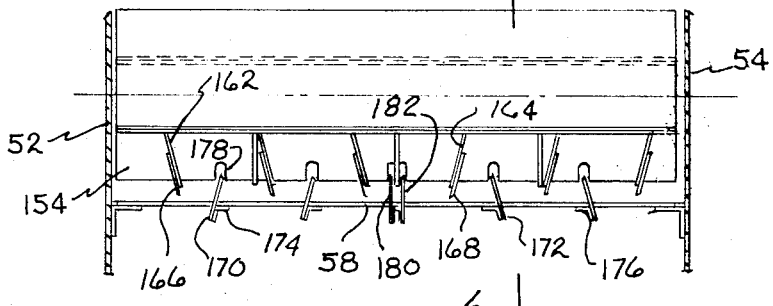
FIG. 4 is a sectional view of the intermediate beater taken along the line 4—4 of FIG. 3.

The intermediate or first beater 66 shown in FIGS. 2, 3 and 6 comprises a cylindrical shaft 136 extending across the crop elevator and mounted in flangette bearings 138,140 in the side walls 52 and 54, respectively. The shafts have, adjacent the bearings, keyed collars 142,144 with flanged rectangular plates 146 and 148 secured thereto. Extending across the crop elevator are four L-shaped plates 150,152,154,156 secured to the members 146 and 148 and welded along flanges to one another to form the outwardly extending blades that extend from wall to wall. The beater is divided longitudinally or axially into four parts, as best shown in FIGS. 3 and 4. The partitions are formed by metal plates fitting in the exterior spaces 158 formed by the blade members 150,152,154,156 (FIG. 6). The plates 158 (FIG. 4 and 6) have curved outer edges conforming to the periphery subscribed by the outer ends of the blades and have straight inner edges perpendicular to one another to seat against the blades and fastened thereto by welding. A semi-circular, anti-wrap means 160 on the walls 52,54 is positioned close to the periphery of the blades to prevent crop material from entering between the beaters and the side walls.

In the compartments formed by the partitions are knife mountings 162 (FIG. 4) on the right hand side of the beater and mountings 164 on the left side of the beater. The knife mountings 162 and 164 are tilted towards the center and support knives 166 and 168, respectively. The knives extend outwardly beyond the periphery of the blades of the beater to cut the harvested crop as it is impelled by the beater. On the bottom wall 58 underneath the intermediate beater and slightly to the rear of the center or axis of rotation, there are stationary knives 170 and 172 secured to angles 174,176 welded to the outer side of the bottom wall 58 (FIG. 7). The angles 174,176 hold the knives 170,172, respectively, at transverse angles to the wall 58 with the knives 170 tilted towards the knives 172. The knives 170 and 172, as with the knives 166 and 168, extend in fore-and-aft planes to cut the crop material. The beater blades, as shown in FIG. 4, have notches 178 for each knife 170 and 172 so that the knives overlap with the peripheral edges of the intermediate beater 66 and the knives 166 and 168 overlap with the knives 170 and 172. The rotating knives and the stationary knives are not in cutting relation with one another.

At the center of the wall 58, two parallel knives 180 and 182 (FIG. 8) are secured on the outer side of the wall 58 and extend through the wall to overlap with the center partition on the intermediate beater. The knives overlap with the center partition by extending into the slots 184 on opposite sides of the center partition in the beater blades. The knives 180 divide the crop mat into two separate pieces for feeding the crop material to the side-by-side axial flow units. The stones and other debris are removed from the crop material by the downwardly moving blades of the intermediate beater striking the debris. The downwardly moving blades project the debris transversely to the movement of the crop material. A stone trap, later described herein, receives the downward projected debris.

REAR BEATER OF THE CROP ELEVATOR

The rear beater 68 is generally similar in construction to the intermediate beater 66 and has a shaft 190 extending across the crop elevator and through the side walls 52 and 54 for rotatable mounting the shaft in bearings 192 and 194 which are mounted on the exterior side of the walls 52 and 54. The shaft 190 has collars 196 and 198 adjacent to the side walls and keyed to the shaft. On the collars are flanged plates 200,202. Blades 204, 206,208,210 are secured to the flanges of the plates 200,202 and have flanges along the respective inner edges for welding to an adjacent blade. The blades extend across the crop elevator and are rotated for discharging the crop material through the rear opening 62 of the casing on the side of the beater in the direction of feed, the side walls have semi-circular, anti-wrap means 214 extending close to the periphery of the blades to prevent crop material from entering between the beater and the side wall 52,54 to wrap around the shaft 190.

CROP ELEVATOR DRIVES

The crop elevator is mounted pivotally on the combine in a conventional manner by bushings 216,217 fitting in yokes (not shown) on the combine. Bushings 216 and 218 are secured to the outside of the walls 52,54. The bushings 216 and 218 form bearing housings for the bearings 192 and 194 which rotatably supports the shaft 190 of the rear beater. The shaft 190 on the right side extends beyond the bushing 216 and has sprockets 220 and 222 rotatably mounted on the projecting end. The sprockets are keyed together and the sprocket 220 is connected by a chain 224 to the drive sprocket 226 on the combine. The sprocket 226 is part of a drive (not shown) connected to the motor 32.

The shaft 101 of the chain conveyor also extends beyond the bearing 122 on the right side and has a slip clutch 230 keyed thereto with a sprocket 232 mounted on the slip clutch. The sprocket 232 is connected to the sprocket 222 by a chain 234 to drive the chain conveyor, intermediate beater and rear beater through the slip clutch. Thus, the chain conveyor and beaters are driven by the chain and sprocket means 236 through the slip clutch 230.

The intermediate beater 66 is driven by a chain and sprocket drive 238 on the left side of the crop elevator which comprises a sprocket 240 on the shaft 101 and the sprocket 242 on the shaft 136 of the intermediate beater. The sprockets are interconnected by chain 244. The rotary rear beater 68 is also driven through the chain and sprocket drive 238 and chain and sprocket drive 246 comprising a sprocket 248 coupled to the sprocket 250 on the rear beater by the chain 252. The header drive 253 is driven by a forward chain and sprocket drive 254 comprising a sprocket 256 on the shaft 101, a sprocket 258 on the header drive 253 and the chain 260 connecting the two sprockets. Thus, the rear and intermediate beaters are driven by means of the chain and sprocket drive 236 on the right side of the crop elevator through the shaft 101 to the chain and sprocket drives 238 and 246 on the left side of the elevator.

The header drive is driven by the forwardly extending chain and sprocket drive 254. As shown in FIG. 5, each of the chain and sprocket drives are provided with idlers adjustably mounted on the side of the crop elevator. There is an idler 264 for the chain and sprocket drive 244, an idler 266 for the chain and sprocket drive 246 and an idler 270 for the chain and sprocket drive 254. The shaft 120 is rotated at 450 rpm so that the peripheral speed is about 190 meters per minute. The intermediate beater 66 is rotated at 545 rpm so that the peripheral speed is about 600 meters per minute and the rear beater is rotated at 900 rpm so that the peripheral speed is about 675 meters per minute. The crop is thus progressively increased in speed as it is transferred through the crop elevator to discharge the crop into the threshing and separatig means at a speed compatible with the rotation of the rotor 21.

STONE TRAP

As the crop material moves between the chain type conveyor to the intermediate beater, the blades strike the debris downwardly into the stone trap 270 to clear the crop material of debris while the intermediate beater accelerates the softer crop material to the rear. Thus the crop elevator delivers the thin mat of harvested crop material to the combine absent of any debris.

The stone trap generally comprises an opening 272 extending across the bottom wall beneath the forward portion of the intermediate beater and an L-shaped concave door 274 on the outer side of the wall closing the opening. The door is pivotally fastened to the bottom wall along the rear transverse edge of the door by hinges 276 and is detachably secured along the front edge of the door by an over-center catch means 277. The over-center catch means, best shown in FIG. 2, comprises handles 278 with knobs 280, rods 281 and shaft 284. The handles 278 are on opposite sides of the elevator and extend downwardly beyond the bottom wall. The shaft 284 extends across the crop elevator and is connected to the handles to rotate about the hinges 278. The handles are connected to the shaft by the rods 281 pivotally mounted in the upper ends of the handles and extending through the shaft 284. The knobs 280 limit the over-center locking of the handles. The shaft 284 hinges the door 274 rearwardly for opening up the stone trap and removing the stones and debris.

The crop material is discharged rearwardly towards the intermediate beater along a trajectory extending below the shaft 136 of the intermediate beater 66. The downwardly moving blades sweep the crop rearwardly. However, any stones or debris in the mat are struck by the rapidly rotating blades and deflected downwardly into the stone trap. The soft crop material permits the rocks to fall into the trough and displace the material. The deflected debris may project transversely to the mat or at a downward angle from the mat to separate the debris from the crop material. Periodically the trough 274 is opened and the collected crop material and rocks are emptied. Thus, the objectionable rocks and debris are separated out from the mat of crop material fed to the combine and damage to the threshing means is avoided.

OPERATION

The harvested crop material is fed by the consolidating auger on the header through the front opening 60 to the chain conveyor 64. This conveys the harvested crop material up along the plate 126 and discharges it into the path of the rotating blades of the intermediate beater 66 in which the rotating knives mounted on the intermediate beater and the stationary knives mounted on the bottom wall 58 cut the crop to facilitate the transmission and feeding of the crop to the threshing means of the combine. The intermediate beater increases the speeds of flow and thins the mat of crop material. Rocks, debris and the like are struck downwardly into the stone trap while the beater accelerates the crop rearwardly and propels it into the immediate following rear beater which is rotating at a greater linear speed than the intermediate beater to further accelerate the crop and discharge it into the feeding means 23a of the axial threshing and separating units as a thin mat of rapidly moving crop material compatible with the speed of the rotor. The periphery of the blades of the intermediate beater 66 are immediately adjacent to the end of the chain conveyor and the periphery formed by the rotating blades of the intermediate beater and the rear beater are closely adjacent to one another for efficient transfer of crops therebetween.

While conforming to the standard attachments and size of the conventional crop elevator this improvement eliminates the debris and discharges the crop material as a thin, rapidly moving mat of crop material of substantially constant thickness and at a speed compatible with the speed of the feeding and threshing means of an axial flow unit.

While the invention has been described in connection with a particular embodiment thereof, it will be understood that it is capable of further modifications, and this application is intended to cover any variations, uses or adaptations of the invention following, in general, the principles of the invention including such departures from the present disclosure as come within known or customary practices in the art to which the invention pertains, and as may be applied to the essential features hereandbefore set forth, and as fall within the scope of the invention or of the limits of the appended claims.

Having thus described our invention, what we claim is:

1. A crop elevator for a combine comprising
   a housing with a bottom wall and two opposite side walls, said housing having a front intake opening and a rear discharge opening, said bottom wall having a feed plate within and extending across said housing between said side walls and adjacent to said bottom wall and at a greater distance therefrom along the rearward portion thereof,
   a chain type crop conveyor having forward and intermediate transverse rotatable means and chains coupling said means and having conveyor elements extending between said chains for drawing crop material along said feed plate as a thick slow moving mat, said forward rotatable means being at said front intake opening and said intermediate rotatable means being between said front intake opening and said rear discharge opening and being further from said feed plate than said forward rotatable means,
   means for rotatably and pivotally mounting said forward rotatable means for movement to and from said feed plate on passage of crops therebetween,
   means for adjustably and rotatably mounting said intermediate rotatable means on said side walls to vary the distance between said chains at said intermediate rotatable means and said feed plate depending on the crop being harvested,
   an intermediate beater extending transversely immediately to the rear of said chain type crop conveyor and of larger diameter than said intermediate rotatable means with the lower half being behind said space between said chain type crop conveyor and said feed plate for receiving the harvested crop in a direction below the axis of rotation of the intermediate beater, said intermediate beater rotating at a greater peripheral speed than said chain conveyor to increase the speed of the harvested crop,
   a rear beater extending across said housing adjacent to and rearwardly of said intermediate beater and at said rear discharge opening, said rear beater rotating peripherally faster than said intermediate beater to discharge the harvested crop at a greater speed than the speed imparted by said intermediate beater, and
   a stone trap extending across said elevator on said bottom wall below the forward portion of said intermediate beater and immediately to the rear of said feed plate, said intermediate beater receiving the harvested crop discharged by the chain conveyor from the rear end of said feed plate to strike stones, debris and the like downwardly into the trap to clear debris from the harvested crop swept rearwardly by said intermediate beater at an increased speed to said fastern rotating rear beater for further increasing the speed of the harvested crop and discharging as a thin debris free mat through the rear discharge opening.

2. A crop elevator for a combine comprising
a housing with a bottom wall and two opposite side walls, a forward opening for the reception of crop material and a rearward opening for the discharge of crop material, said housing being adapted to be secured to a combine adjacent said rearward opening, said bottom wall having a feed plate extending across said housing and rearward at an angle to said bottom wall spacing the rear of said plate from said bottom wall,
a chain type of crop conveyor mounted within said housing between said side walls above said feed plate and terminating at the rear of said feed plate for conveying crop material and projecting it rearwardly in a path spaced from said bottom wall,
a rotatable beater extending and within across said housing immediately to the rear of said chain type conveyor, said beater having its axis of rotation above the rearward projection of said feed plate and having blades movable downwardly adjacent said rear of said chain type of crop conveyor and rearwardly along the bottom wall to strike debris in the crop material downwardly while sweeping the crop material rearwardly, and
a stone trap in the bottom wall between the forward and rearward openings and below the forward portion of said beater to receive and hold the downwardly struck debris clear of the flow of crop material.

3. A crop elevator as set forth in claim 2 wherein said stone trap comprises an opening in said bottom wall and an L-shaped door hingedly secured on the outer side of said bottom wall for receiving and holding debris.

4. A crop elevator for a combine comprising:
a generally fore-and-aft extending housing with a forward opening for the reception of crop material and a rearward opening for the discharge of crop material, said housing being adapted to be secured to a combine adjacent said rearward opening,
a chain crop conveyor mounted within said housing and extending rearwardly from the front opening to a point intermediate said openings and operable upon rotation to convey a mat of crop material rearwardly within said housing,
a rotatable beater extending across and within said housing immediately to the rear of said chain type conveyor, said beater intercepting the mat of rearwardly conveyed crop material and being operable upon rotation to strike debris in the crop material downwardly while sweeping the crop material rearwardly,
means operable to rotate said crop conveyor and said beater, and
a stone trap carried by said housing between the openings and below said beater, said stone trap being adapted to receive and hold the downwardly struck debris clear of the flow of mat crop material as it is swept rearwardly by the beater.

5. A crop elevator as set forth in claim 4 wherein said means operable to rotate said crop conveyor and said beater rotates said beater at a peripheral speed greater than the linear speed of said chain type crop conveyor.

6. A crop elevator as set forth in claim 4 in which said housing includes a bottom wall and two opposite side walls, said stone trap being supported by said bottom wall and extending beneath said wall.

7. A crop elevator as set forth in claim 6 further characterized by the provision of ramp means extending across said housing and rearward at an angle to said bottom wall, said ramp means terminating at a point adjacent the end of the chain type of crop conveyor, the upper surface of said ramp means lying in a plane which lies below the axis of said beater.

8. A crop elevator as set forth in claim 4 wherein a second beater is mounted within said housing rearwardly of beater which is immediately to the rear of said chain type conveyor, said second beater being operable upon rotation to sweep into the crop material rearwardly within the housing toward the rearward opening for discharge, and means operable to rotate said second beater at a peripheral speed greater than said first beater whereby the crop material is accelerated as it passes from said first beater to said beater.

* * * * *

UNITED STATES PATENT OFFICE
CERTIFICATE OF CORRECTION

Patent No. 3,779,251           Dated    December 18, 1973

Inventor(s)   Edward William Rowland-Hill et al

It is certified that error appears in the above-identified patent and that said Letters Patent are hereby corrected as shown below:

Column 9, Line 18, "and within across" should read --across and within--.

Signed and sealed this 23rd day of April 1974.

(SEAL)
Attest:

EDWARD M.FLETCHER,JR.  
Attesting Officer

C. MARSHALL DANN  
Commissioner of Patents